US008495690B2

(12) United States Patent
Lee et al.

(10) Patent No.: US 8,495,690 B2
(45) Date of Patent: Jul. 23, 2013

(54) SYSTEM AND METHOD FOR IMAGE INFORMATION PROCESSING USING UNIQUE IDS

(75) Inventors: Yun Kyung Lee, Daejeon (KR); Jong Wook Han, Daejeon (KR); Geon Woo Kim, Daejeon (KR); Deok Gyu Lee, Yongin-si (KR); Kyo Il Chung, Daejeon (KR); Jong Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 343 days.

(21) Appl. No.: 12/808,501

(22) PCT Filed: Oct. 10, 2008

(86) PCT No.: PCT/KR2008/005999
§ 371 (c)(1),
(2), (4) Date: Jun. 16, 2010

(87) PCT Pub. No.: WO2009/078563
PCT Pub. Date: Jun. 25, 2009

(65) Prior Publication Data
US 2010/0277600 A1 Nov. 4, 2010

(30) Foreign Application Priority Data
Dec. 17, 2007 (KR) ........................ 10-2007-0132799

(51) Int. Cl.
*H04N 7/173* (2006.01)
*H04N 5/232* (2006.01)
(52) U.S. Cl.
USPC .................... 725/105; 348/211.3; 348/211.11

(58) Field of Classification Search
USPC ... 348/211.3, 211.11, 207.1, 211.12; 725/105
See application file for complete search history.

(56) References Cited

U.S. PATENT DOCUMENTS

| 7,071,972 | B2* | 7/2006 | Koyama | 348/211.3 |
| 7,683,940 | B2* | 3/2010 | Fleming | 348/222.1 |
| 8,379,092 | B2* | 2/2013 | Lee et al. | 348/207.99 |

(Continued)

FOREIGN PATENT DOCUMENTS

| JP | 2007-049335 A | 2/2007 |
| KR | 10-2001-0097563 A | 11/2001 |

(Continued)

OTHER PUBLICATIONS

International Search Report issued on Apr. 17, 2009 in International Application No. PCT/KR2008/005999.

*Primary Examiner* — John Villecco
(74) *Attorney, Agent, or Firm* — Kile Park Reed & Houtteman PLLC (57) ABSTRACT

A system and method for image information processing are disclosed. The system for image information processing includes: at least one image pickup terminal for providing image data picked up through a camera; an image information processing server for processing data collected from at least one image pickup terminal into data of a new format; and an application server for receiving the processed data from the image information processing server and providing the same to at least one user terminal. The amount of transmission data can be reduced and the reliability of information security can be increased since it is possible to allocate unique IDS to a plurality of image pickup terminals and application servers and identify the image pickup terminals and application servers only by their unique IDs without containing any particular information upon data transmission.

15 Claims, 5 Drawing Sheets

U.S. PATENT DOCUMENTS

| | | | |
|---|---|---|---|
| 2003/0164877 A1* | 9/2003 | Murai | 348/143 |
| 2004/0189871 A1* | 9/2004 | Kurosawa et al. | 348/552 |
| 2005/0132414 A1* | 6/2005 | Bentley et al. | 725/105 |
| 2005/0152287 A1* | 7/2005 | Yokomitsu et al. | 370/255 |
| 2005/0226413 A1* | 10/2005 | Wada | 380/210 |
| 2006/0053459 A1* | 3/2006 | Simerly et al. | 725/105 |
| 2006/0078047 A1* | 4/2006 | Shu et al. | 375/240.01 |
| 2006/0143684 A1* | 6/2006 | Morris | 725/138 |
| 2006/0236357 A1* | 10/2006 | Walker et al. | 725/105 |
| 2006/0250507 A1* | 11/2006 | Miyajima et al. | 348/231.5 |
| 2007/0220569 A1* | 9/2007 | Ishii | 725/105 |
| 2008/0240686 A1* | 10/2008 | Nagaya et al. | 386/124 |
| 2009/0037967 A1* | 2/2009 | Barkan et al. | 725/105 |
| 2009/0059945 A1* | 3/2009 | Yokomitsu et al. | 370/419 |
| 2009/0185784 A1* | 7/2009 | Hiroike et al. | 386/69 |
| 2011/0199484 A1* | 8/2011 | Uchihara | 348/143 |
| 2012/0050549 A1* | 3/2012 | Maekawa | 348/207.1 |

FOREIGN PATENT DOCUMENTS

| | | |
|---|---|---|
| KR | 10-2002-0039183 A | 5/2002 |
| KR | 10-2002-0039185 A | 5/2002 |
| KR | 10-2002-0046233 A | 6/2002 |
| KR | 10-2002-0079266 A | 10/2002 |
| KR | 10-0713307 B1 | 4/2007 |
| KR | 10-0744752 B1 | 7/2007 |
| WO | WO 2009078554 A1 * | 6/2009 |

* cited by examiner

| Image terminal ID | Device number | Device type | Installation location | Proprietary information |
|---|---|---|---|---|
| #M0001 | ctv-1234 | CCTV | 123, Yeoksam-dong, Gangnam-gu, Seoul | Yeoksam A |
| #M0020 | ctv-2345 | CCTV | 678, Yeoksam-dong, Gangnam-gu, Seoul | Yeoksam B |
| #M0074 | ctv-3001 | CCTV | 10, Gajeong-dong, Yuseong-gu, Daejeon | Yuseong C |
| #M0112 | ctv-6700 | CCTV | 20, Gajeong-dong, Yuseong-gu, Daejeon | Yuseong D |
| ⋮ | ⋮ | ⋮ | ⋮ | ⋮ |

Figure 3

| Application server ID | Application server IP | Provision service |
|---|---|---|
| * S0123 | 123.456.78.0 | Seoul city traffic condition |
| * S1222 | 234.587.89.1 | Daejeon city traffic condition |
| ⋮ | ⋮ | ⋮ |

Figure 4

| Application server ID | Image terminal ID | Service provision type |
|---|---|---|
| *S0123 | #M0001 | Table |
|  | #M0020 |  |
| *S1222 | #M0074 | Table |
|  | #M0112 |  |

SYSTEM AND METHOD FOR IMAGE INFORMATION PROCESSING USING UNIQUE IDS

TECHNICAL FIELD

The present invention relates to a system and method for image information processing, and more particularly, to a system and method for image information processing which processes an image picked up by an image pickup terminal into data suitable for a requested service and provides the same.

This work was supported by the IT R & D program of MIC/IITA [2006-S-067-02, "The Development of Security Technology based on Device Authentication for Ubiquitous Home Network"].

BACKGROUND ART

Generally, a server for providing an image information service is provided with image data from a certain image pickup terminal, and provides an image information service based on this image data. In this case, the certain image pickup terminal transmits information about the corresponding image pickup terminal along with the picked-up image data. At this time, the image pickup terminal information to be transmitted includes device information, such as a device type and a device number, and information, such as installation location. Therefore, if the size of a picked up image data is large, there is a problem that a load caused by data transmission occurs because information of the image pickup terminal has to be added in data transmission.

Additionally, the server that has been provided with image data from a certain image pickup terminal reads data received from the image pickup terminal, senses each of information of the image pickup terminal contained in the data, detects image pickup terminal information conforming to a users request, and provides the same to the user.

However, if the server receives image data from a plurality of image pickup terminals all at once, or various services are requested from the user all at once, the server has a problem of efficiency degradation in the management of image data and services.

DISCLOSURE

Technical Problem

It is an object of the present invention to provide a system and method for image information processing which can efficiently manage an image pickup terminal and a server for providing an application service and increase data transmission efficiency upon processing an image picked up by the image pickup terminal into data suitable for an application service and providing the same to a user.

Technical Solution

To achieve the above object, there is provided a system for image information processing according to the present invention, comprising: an image information processing server for processing data collected from at least one image pickup terminal providing a predetermined image data and generating data of a new format; and an application server for receiving processed data from the image information processing server and providing the same to at least one user terminal. At this time, the image information processing server registers information of the at least one image pickup terminal and the application server, and allocates unique IDs to the image pickup terminal and the application server, respectively.

Meanwhile, the unique IDs include an identifier for discriminating the image pickup terminal and the application server.

Furthermore, the at least one image pickup terminal registers the unique ID allocated from the image information processing server, and transmits the registered unique ID at the time of image data transmission. The application server registers the unique ID allocated from the image information processing server, and transmits the registered unique ID to the image information processing server upon a request for a predetermined service.

The image information processing server stores the information of the image pickup terminal and application server corresponding to the unique IDs, senses the unique ID for at least one image pickup terminal providing image information corresponding to the requested service upon a request for a predetermined service from the application server, and processes image data collected for the sensed unique ID.

Furthermore, there is provided a method for image information processing according to the present invention, comprising the steps of: receiving at least one image pickup terminal information and at least one application server information and registering the same; allocating unique IDs for the at least one image pickup terminal and the application server, respectively; and classifying the unique ID allocated to the application server and the unique ID of the corresponding at least one image pickup terminal based on the registered information and making the same into a database.

Meanwhile, the method for image information processing further comprises the step of transmitting the unique IDs allocated to the at least one image pickup terminal and the application server to the at least one image pickup terminal and the application server, respectively.

At this time, the unique ID allocated to the at least one image pickup terminal includes an identifier for identifying a unique ID for an image pickup terminal, and the unique ID allocated to the at least one application server includes an identifier for identifying a unique ID for the application server.

Furthermore, there is provided another method for image information processing according to the present invention, comprising the steps of: receiving image data picked up from at least one registered image pickup terminal; collecting the received image data for each unique ID allocated to the at least one image pickup terminal; and upon a service request from at least one registered application server, processing predetermined image data among the image data collected for each unique ID and providing the same.

At this time, unique ID information allocated to the at least one image pickup terminal is received by being included in the image data.

Furthermore, the method for image information processing comprises the steps of: sensing a unique ID of the image pickup terminal providing image data corresponding to a predetermined requested service among the at least one image pickup terminal; and processing the image data collected for the sensed unique ID.

Meanwhile, upon a service request from the at least one application server, unique ID information allocated for the at least one application server is received.

predetermined information from at least one image pickup terminal and application server and registering the same; allocating unique IDs for the at least one image pickup terminal and the application server, respectively; and classifying the unique ID allocated to the application server and the unique ID of the corresponding at least one image pickup terminal based on the registered information and making the same into a database.

A port setting method of an application system according to the present invention comprises the steps of: requesting a naming server for object information corresponding to name information of the other components upon data transmission to the other components; determining whether there exists consistent information based on the object information of the other components received from the naming server; selecting a certain protocol according to the result of determination; and establishing a connection with the other components by use of the selected protocol.

Furthermore, the method further comprises the step of: sensing EndPoint information contained in the object information of the other components for comparison.

Advantageous Effects

If there exists consistent information among the object information of the other components, it is sensed that the other components are components belonging to the same node, and if there exists no consistent information among the object information of the other components, it is sensed that the other components are components belonging to a remote node.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Hereinafter, an embodiment of the present invention will be described below with reference to the accompanying drawings.

Figure 1:
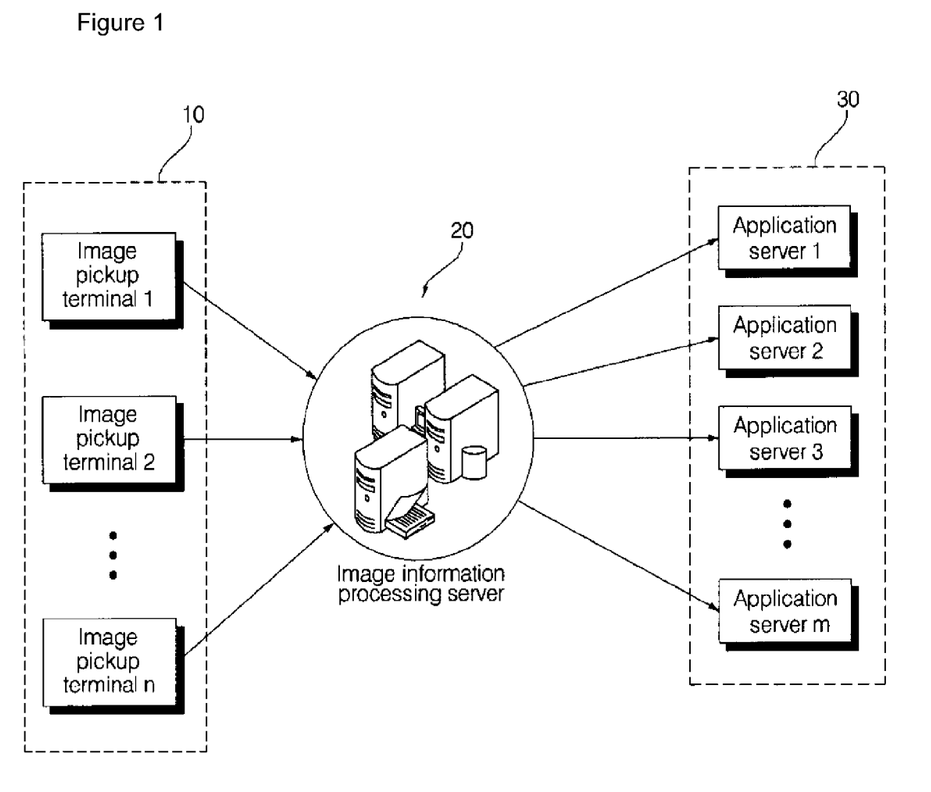
FIG. 1 is a view illustrating the configuration of a system for image information processing according to one embodiment of the present invention.

FIG. 1 is a view illustrating the configuration of a system for image information processing according to one embodiment of the present invention. Referring to FIG. 1, the system for image information processing according to the present invention includes an image pickup terminal 10, an image information processing server 20 and an application server 30.

Here, the image pickup terminal 10 is at least one terminal for picking up image data, which includes a CCTV, a camcorder, a camera, etc. The image pickup terminal 10 transmits picked up image data to the image information processing server 20. At this time, the image pickup terminal 10 registers a unique ID allocated from the image information processing server 20, and transmits the registered unique ID upon transmitting the picked up image data to the image information processing server 20.

The image information processing server 20 stores information about at least one image pickup terminal 10. At this time, when image pickup terminal information is received, the image information processing server 20 registers the inputted image pickup terminal information, and allocates the corresponding unique ID thereto.

The unique ID allocated from the image information processing server 20 is stored in the corresponding image pickup terminal 10, and when image data is received from any one of a plurality of image pickup terminals 10, the corresponding image pickup terminal 10 is identified from the unique ID included in the received image data.

Further, the image information processing server 20 stores information about at least one application server 30. At this time, when information of at least one image information processing server 20 is inputted, the image information processing server 20 registers the inputted information of the image information processing server 20, and allocates the corresponding unique ID thereto.

The unique ID allocated from the image information processing server 20 is stored in the corresponding application server 30, and when a request signal is received from any one of a plurality of application servers 30, the corresponding application server 30 is identified from the unique ID included in the received request signal.

At this time, if there is a predetermined service request from the application server 30, the image information processing server 20 combines image data received from at least one image pickup terminal 10 according to the request from the application server 30, and processes the same into new data. At this time, the processed data is transmitted to the application server 30 that has requested for the service.

The application server 30 registers application server information in the image information processing server 20 by transmitting it to the image information processing server 20, and, whereupon, it registers the unique ID allocated from the image information processing server 20. Therefore, the application server 30 transmits the registered unique ID to the image information processing server 20 upon a request for a predetermined service. Further, the application server 30 is provided with a predetermined service from the image information processing server 20, and provides the service to at least one user terminal that has requested for the corresponding service to the application server 30.

Figure 2:
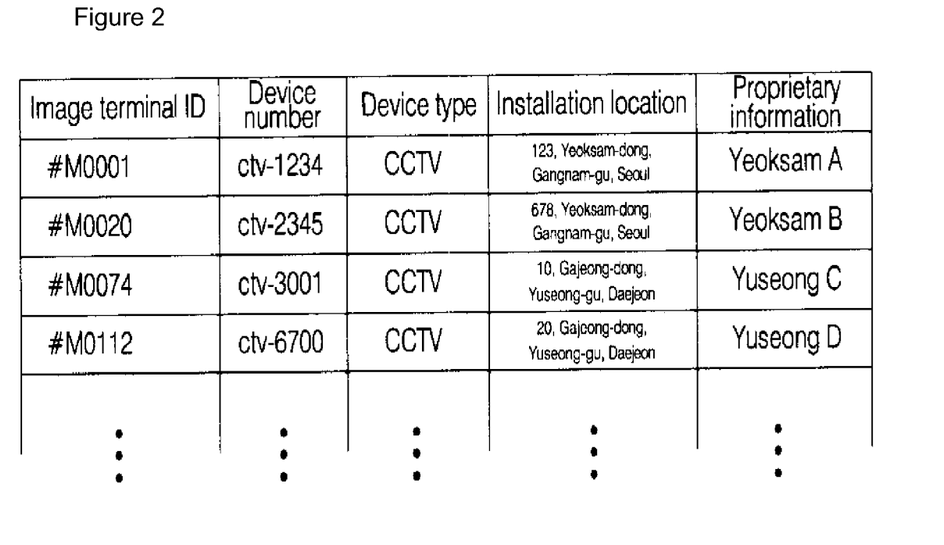
FIGS. 2 to 4 are views referred to for describing the operation of the system for image information processing according to one embodiment of the present invention.
Figure 3:
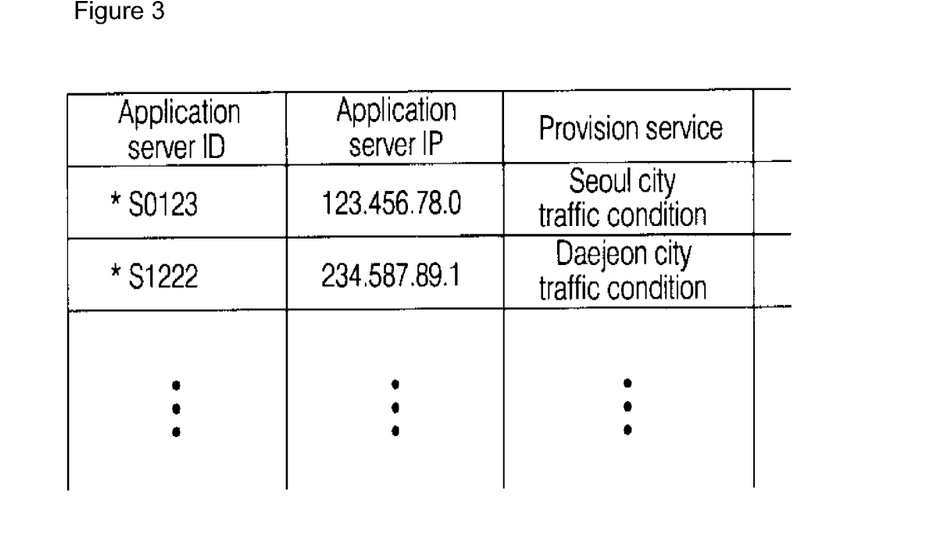
Figure 4:
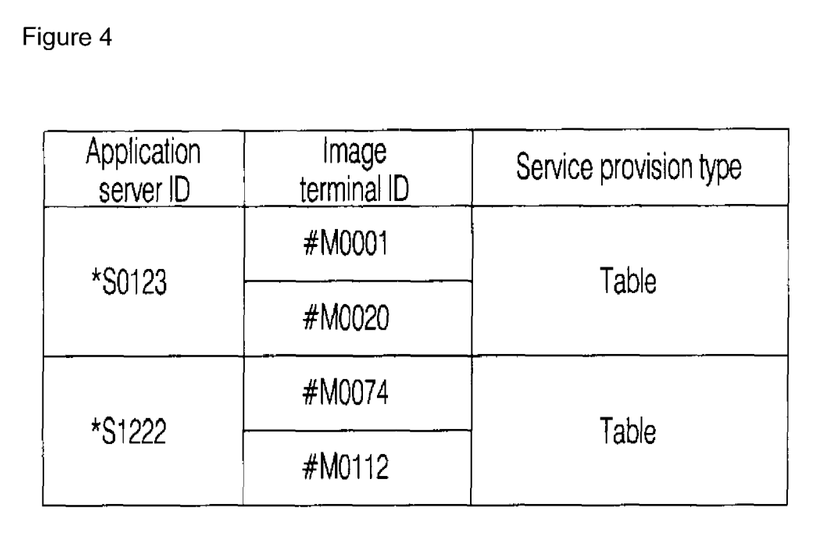

FIGS. 2 to 4 are views referred to for describing the operation of the system for image information processing according to one embodiment of the present invention.

First, FIG. 2 is a view illustrating an embodiment of a database for information of an image pickup terminal that is to be stored in an image information processing server.

Referring to FIG. 2, when information, such as device information, device type, installation location, and proprietary information, is inputted, the image information processing server 20 registers the inputted image pickup terminal information, and allocates the corresponding unique ID thereto.

At this time, the image information processing server 20 includes an identifier for identifying a unique ID for an image pickup terminal 10 in order to discriminate this unique ID against a unique ID for an application server upon allocating a unique ID for the image pickup terminal 10.

That is, as shown in FIG. 2, upon registration of information for at least one registered image pickup terminal 10, the image information processing server 20 stores unique IDs, '#M001', '#M0020', '#M0074' and '#M0112' allocated for at least one image pickup terminal 10. Hereupon, the image information processing server 20 can easily identify from the identifier '#M' that a corresponding ID is an ID for the image pickup terminal 10.

Therefore, when picked up image data is received from the image pickup terminal 10, the image information processing server 20 can acquire information about the corresponding image pickup terminal 10 from the unique ID received together with the image data.

Likewise, the image pickup terminal 10 does not have to attach separate information in addition to a unique ID upon transmission of picked up image data, thereby relieving a load of data transmission.

FIG. 3 is a view illustrating an embodiment of a database for information of an application service server stored in an image information processing server.

Referring to FIG. 3, the image information processing server 20 registers application server information, such as an application server IP for the application server 30, a registered information provision service, charging information for an information provision service, and a service provision type, and allocates a unique ID therefore. At this time, the image information processing server 20 includes an identifier for identifying a unique ID for an application server 30 in order to discriminate this unique ID against a unique ID for an image pickup terminal 10 upon allocating a unique ID for the application server 30.

That is, as shown in FIG. 3, upon registration of information for at least one registered image pickup terminal 10, the image information processing server 20 stores unique IDs, '*S0123' and '*S1222' allocated for at least one image pickup terminal 10. Hereupon, the image information processing server 20 can easily identify from the identifier '*S' that a corresponding ID is an ID for the image pickup terminal 10.

Therefore, when there is a predetermined service request from the application server 30, the image information processing server 20 can acquire information about the corresponding application server 30 from the unique ID received together with the service request.

Likewise, the application server 30 does not have to attach separate information in addition to a unique ID upon a service request to the image information processing server 20, thereby relieving a load of data transmission.

FIG. 4 is an illustrative view showing an embodiment of a database for information matching between an image pickup terminal and an application server that are to be stored in an image information processing server, which illustrates corresponding image pickup terminal information in order to collect information about a service requested from the application server.

Referring to FIG. 4, the information provision service registered for the application server '*S0123' in FIG. 3 is 'Seoul City Traffic Condition Service'. At this time, as shown in FIG. 2, the image information processing server 20 stores information matching with '#M0001' and '#0020' which are 'CCTVs' installed in the Seoul City, among at least one or more registered image pickup terminals 10.

Further, the information provision service registered for the application server '*S1222' is 'Daejeon City Traffic Condition Service'. At this time, as shown in FIG. 2, the image information processing server 20 stores information matching with '#0074' and '#M0112' which are 'CCTVs' installed in the Daejeon City, among at least one or more registered image pickup terminals 10.

The image information processing server 20 creates a table by using the image information received from the image pickup terminals '#0001' and '#0020' in order to provide the 'Seoul City Traffic Condition Service' registered for the application server '*S0123' At this time, the created table is transmitted to the application server '*S0123'.

Likewise, the image information processing server 20 creates a table by using the image information received from the image pickup terminals '#M0074' and '#M1222'? in order to provide the 'Daejeon City Traffic Condition Service registered for the application server '*S1222'. At this time, the created table is transmitted to the application server '*S1222'

Accordingly, the image information processing server 20 can easily find out to which application server 30 certain information generated by a combination of data collected from a certain image pickup terminal 10 is to be sent by making a database of information matching with unique IDs of application servers and unique IDs of image pickup terminals 10, thereby increasing the operational efficiency of the image information processing server 20.

The thus-constructed system for image information processing will be described in more detail through its operation flow.

Figure 5:
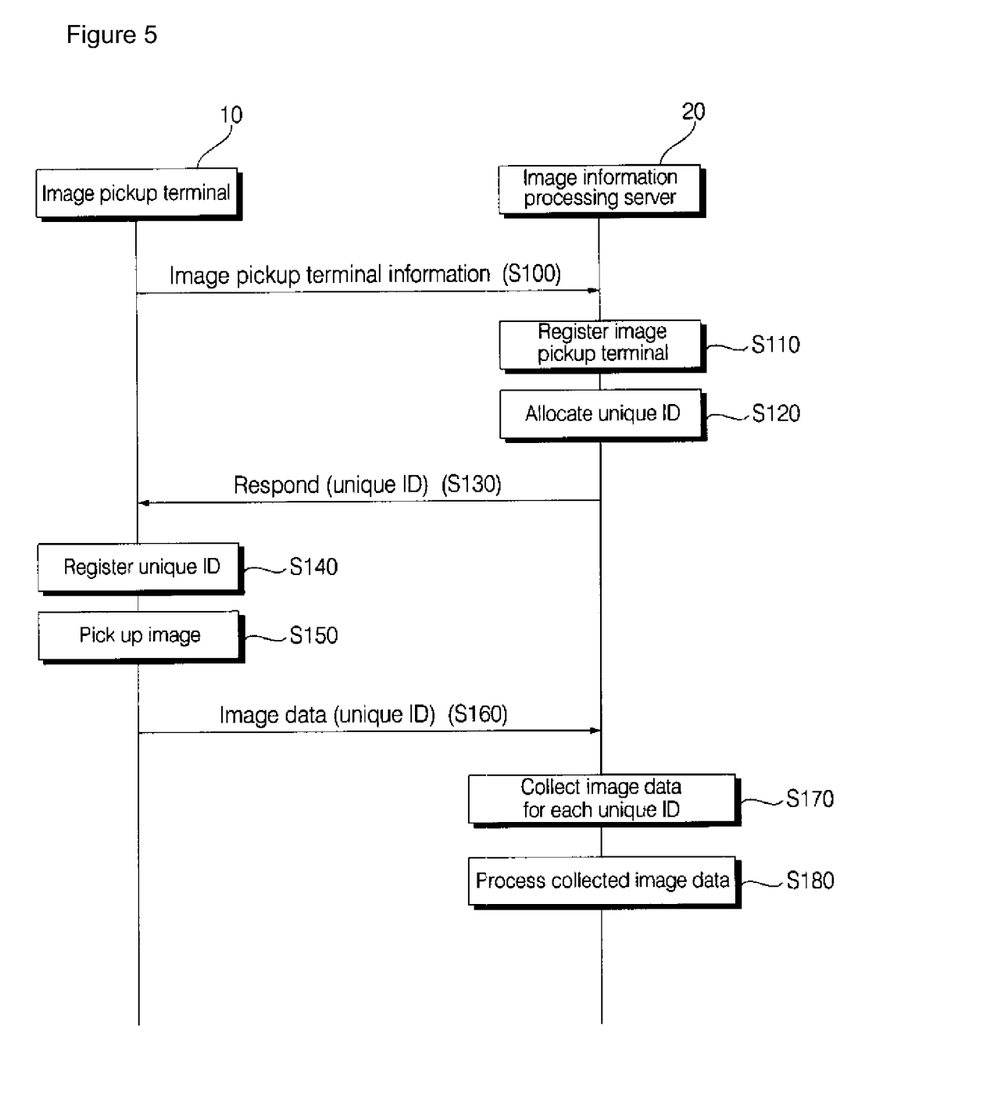
FIGS. 5 and 6 are flow charts illustrating an operation flow for the system for image information processing according to one embodiment of the present invention.
Figure 6:
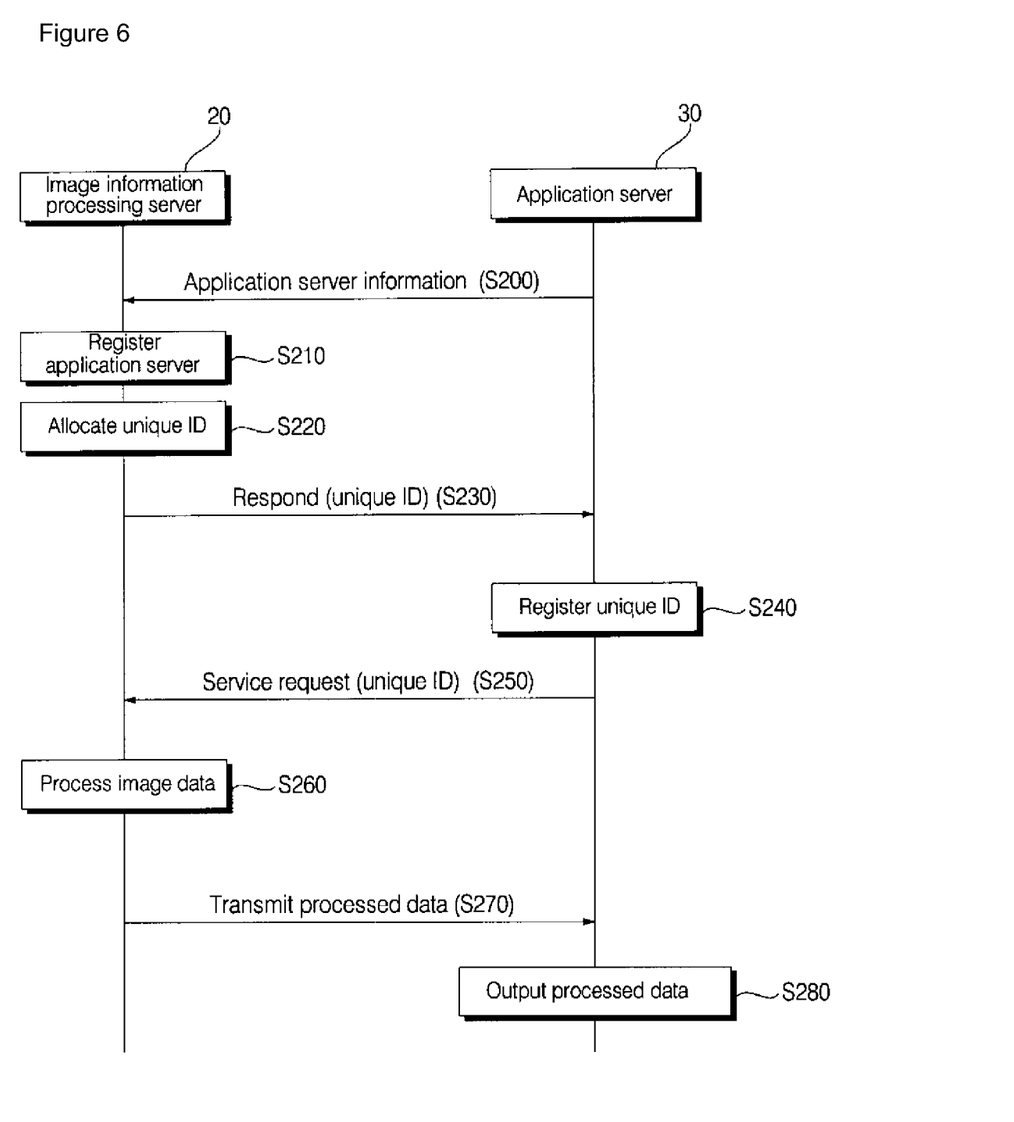

FIGS. 5 and 6 are flow charts illustrating an operation flow for the system for image information processing according to one embodiment of the present invention. First, FIG. 5 is a flow chart illustrating an operation flow between an image pickup terminal and an image information processing server.

As shown in FIG. 5, an image pickup terminal 10 transmits image pickup terminal information to an image information processing server 20 (S100), and the image information processing server 20 having received the image pickup terminal information registers the received image pickup terminal information (S110). At this time, the image information processing server 20 allocates an unique ID for the corresponding image pickup terminal 10 (S120).

Of course, the image pickup terminal information registered in the image information processing server 20 may be information received from the image pickup terminal 10, but may be manually inputted and stored by an administrator.

Further, the image information processing server 20 transmits the unique ID allocated fro the image pickup terminal 10 to the image pickup terminal 10, and the image pickup terminal 10 having received this unique ID registers the received unique ID (S140).

Meanwhile, the image pickup terminal 10 picks up an image of the surroundings, and transmits the picked up image data to the image information processing server 20 along with the registered unique ID (S160).

Accordingly, the image information processing server 20 collects image data received from the image pickup terminal 10 for each unique ID (S170), and processes the collected image data into new data (S180).

FIG. 6 is a flow chart illustrating an operation flow between an image information processing server and an application server.

As shown in FIG. 6, an application server 30 transmits application server information to an image information processing server 20 (S200), and the image information processing server 20 registers the received application server information (S210). At this time, the image information processing server 20 allocates a unique ID for the corresponding application server 30 (S220).

The image information processing server 20 transmits the unique ID allocated for the application server 30 to the corresponding application server 30 (S330), and the application server 30 having received this unique ID registers the received unique ID (S440).

Meanwhile, the application server 30 generates a signal for requesting for a predetermined service and transmits it to the image information processing server 20 along with the registered unique ID (S250).

The image information processing server 20 processes image data collected from the image pickup terminal 10 corresponding to the corresponding service into new data according to the request from the application server 30 (S260), and transmits the processed data to the application server 30 (S270).

Accordingly, the application server 30 stores data received from the image information processing server 20, and provides the stored service to at least one user terminal having requested for the corresponding service (S280).

Although the system and method for image information processing according to the present invention have been described with reference to the illustrated drawings, the present invention is not limited to the embodiments and drawings disclosed in this specification, and can be applied by those skilled in the art within the scope of the technical concept of the present invention.

INDUSTRIAL APPLICABILITY

The system and method for image information processing according to the present invention has the advantages that the amount of transmission data can be reduced and the reliability of information security can be increased since it is possible to allocate unique IDS to a plurality of image pickup terminals and application servers and identify the image pickup terminals and application servers only by their unique IDs without containing any particular information upon data transmission.

Furthermore, as the image information processing server processes collected image data into new data for service provision, various services can be provided according to a combination of data. Besides, an effect of efficient management can be anticipated by allocating unique IDS for a plurality of image pickup terminals and application servers and making a database of information thereof for each unique ID and managing it.

The invention claimed is:

1. A system for image information processing, comprising:
an image information processing server for processing data collected from at least one image pickup terminal providing a predetermined image data and generating data of a new format; and
an application server for receiving processed data from the image information processing server and providing the same to at least one user terminal,
wherein the image information processing server registers information of the at least one image pickup terminal and the application server, and allocates unique IDs to the image pickup terminal and the application server, respectively.

2. The system of claim 1, wherein the unique IDs include an identifier for discriminating the image pickup terminal and the application server.

3. The system of claim 1, wherein the at least one image pickup terminal registers the unique ID allocated from the image information processing server, and transmits the registered unique ID at the time of image data transmission.

4. The system of claim 1, wherein the application server registers the unique ID allocated from the image information processing server, and transmits the registered unique ID to the image information processing server upon a request for a predetermined service.

5. The system of claim 1, wherein the image information processing server stores the information of the image pickup terminal and application server corresponding to the unique IDs.

6. The system of claim 5, wherein the image information processing server senses the unique ID for at least one image pickup terminal providing image information corresponding to the requested service upon a request for a predetermined service from the application server, and processes image data collected for the sensed unique ID.

7. A method for image information processing, comprising the steps of:
receiving at least one image pickup terminal information and at least one application server information and registering the at least one image pickup terminal information and the at least one application server information;
allocating unique IDs for the at least one image pickup terminal and the application server, respectively; and
classifying the unique ID allocated to the application server and the unique ID of the corresponding at least one image pickup terminal based on the registered information and making the classified information into a database.

8. The method of claim 7, further comprising the step of transmitting the unique IDs allocated to the at least one image pickup terminal and the application server to the at least one image pickup terminal and the application server.

9. The method of claim 7, wherein the unique ID allocated to the at least one image pickup terminal includes an identifier for identifying a unique ID for an image pickup terminal.

10. The method of claim 7, wherein the unique ID allocated to the at least one application server includes an identifier for identifying a unique ID for the application server.

11. The method of claim 7, wherein the image pickup terminal information includes identification information and location information about the at least one image pickup terminal, and data information provided through the at least one image pickup terminal.

12. The method of claim 7, wherein the application server information includes at least one of identification information about the at least one application server and service information subscribed for by the at least one application server.

13. A method for image information processing, comprising the steps of:
receiving image data picked up from at least one registered image pickup terminal;
collecting the received image data for each unique ID allocated to the at least one image pickup terminal; and
upon a service request from at least one registered application server, processing predetermined image data among the image data collected for each unique ID and providing the processed image data to the at least one registered application server,
wherein, upon the service request from the at least one registered application server, a unique ID allocated for the at least one registered application server is received.

14. The method of claim 13, wherein the unique ID (information) allocated to the at least one image pickup terminal is received by being included in the image data.

15. The method of claim 13, comprising the steps of:
sensing a unique ID of the image pickup terminal providing image data corresponding to a predetermined requested service among the at least one image pickup terminal; and processing the image data collected for the sensed unique ID.

* * * * *